United States Patent
Behrens et al.

(10) Patent No.: US 11,236,194 B2
(45) Date of Patent: Feb. 1, 2022

(54) CURING AGENT COMPOSITION FOR AN EPOXY RESIN COMPOUND, EPOXY RESIN COMPOUND AND MULTI-COMPONENT EPOXY RESIN SYSTEM

(71) Applicant: Hilti Aktiengesellschaft, Schaan (LI)

(72) Inventors: Nicole Behrens, Munich (DE); Alexander Bornschlegl, Munich (DE); Ursula Pachmayr, Kaufering (DE); Cornelia Wiesmeier, Grafrath (DE); Jeremia Pillar, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/276,852

(22) PCT Filed: Sep. 9, 2019

(86) PCT No.: PCT/EP2019/073940
§ 371 (c)(1),
(2) Date: Mar. 17, 2021

(87) PCT Pub. No.: WO2020/058017
PCT Pub. Date: Mar. 26, 2020

(65) Prior Publication Data
US 2021/0332182 A1     Oct. 28, 2021

(30) Foreign Application Priority Data
Sep. 19, 2018   (EP) .................... 18195415

(51) Int. Cl.
*C08G 59/50*    (2006.01)
*C08K 5/5419*   (2006.01)
*C08K 3/36*     (2006.01)
*C08G 59/24*    (2006.01)

(52) U.S. Cl.
CPC ....... *C08G 59/5026* (2013.01); *C08G 59/245* (2013.01); *C08K 3/36* (2013.01); *C08K 5/5419* (2013.01)

(58) Field of Classification Search
CPC ..... C08L 63/00; C08G 59/5026; C08G 59/40; C08G 59/68
See application file for complete search history.

(56) References Cited

U.S. PATENT DOCUMENTS

| 10,189,744 | B2 | 1/2019 | Dureault et al. | |
| 2012/0322917 | A1* | 12/2012 | Alcazar Jorba | B82Y 30/00 523/468 |
| 2015/0203625 | A1 | 7/2015 | Schroetz et al. | |
| 2016/0159690 | A1 | 6/2016 | Dureault et al. | |
| 2018/0162991 | A1 | 6/2018 | Ortelt et al. | |

FOREIGN PATENT DOCUMENTS

| EP | 2 826 798 | 1/2015 |
| EP | 3 178 861 | 6/2017 |
| WO | 2013/154785 | 10/2013 |

OTHER PUBLICATIONS

International Search Report dated Oct. 29, 2019 in PCT/EP2019/073940, with English translation, 5 pages.
Written Opinion dated Oct. 29, 2019 in PCT/EP2019/073940.
U.S. Appl. No. 17/276,914, filed Mar. 17, 2021, Behrens et al.
U.S. Appl. No. 17/276,939, filed Mar. 17, 2021, Nicole Behrens.
U.S. Appl. No. 17/276,968, filed Mar. 17, 2021, Behrens et al.

* cited by examiner

*Primary Examiner* — Kuo Liang Peng
(74) *Attorney, Agent, or Firm* — Grüneberg and Myers PLLC

(57) ABSTRACT

The invention relates to a curing agent composition for an epoxy resin compound for the chemical fastening of construction elements, to an epoxy resin compound, and to a multi-component epoxy resin system. The invention further relates to a method for the chemical fastening of construction elements in boreholes. The invention also relates to the use of a salt (S) as an accelerator in an epoxy resin compound for chemical fastening, the epoxy resin compound comprising 3-aminomethyl-3,5,5-trimethylcyclohexane and at least one further cycloaliphatic amine which is reactive to epoxy groups.

17 Claims, No Drawings

CURING AGENT COMPOSITION FOR AN EPOXY RESIN COMPOUND, EPOXY RESIN COMPOUND AND MULTI-COMPONENT EPOXY RESIN SYSTEM

CROSS-REFERENCE TO RELATED APPLICATIONS

This application is a National Stage entry under § 371 of International Application No. PCT/EP2019/073940, filed on Sep. 9, 2019, and which claims the benefit of European Application No. 18195415.7, filed on Sep. 19, 2018. The content of each of these applications is hereby incorporated by reference in its entirety.

BACKGROUND OF THE INVENTION

Field of the Invention

The invention relates to a curing agent composition for an epoxy resin compound for the chemical fastening of construction elements, to an epoxy resin compound, and to a multi-component epoxy resin system. The invention further relates to a method for the chemical fastening of construction elements in boreholes. The invention also relates to the use of a salt (S) as an accelerator in an epoxy resin compound for chemical fastening, the epoxy resin compound comprising 3-aminomethyl-3,5,5-trimethylcyclohexan-1-amine and at least one further cycloaliphatic amine which is reactive to epoxy groups.

Description of Related Art

Multi-component mortar compounds based on curable epoxy resins and amine curing agents have been known for some time and are used as adhesives, spackling pastes for repairing cracks and chemical anchors for fastening construction elements such as anchor rods, reinforcing bars, and screws in boreholes of various substrates. Known mortar compounds are, however, highly limited in their use in countries having high temperatures, such as the United Arab Emirates, because the load capacity (failure loads) of the mortar compounds starts to decrease from a temperature of 35° C. Furthermore, high temperatures have a negative impact on the handling behavior and processing time of the mortar compounds on construction sites.

Mortar compounds based on epoxy amine generally have slow curing kinetics, an extended pot life or gel time, and usually low heat resistance and creep resistance. This means that they can be handled easily and reach good load values only in a narrow temperature range. The curing time of mortar compounds based on epoxy amine is generally set by selecting an appropriate amine and/or by adding catalysts such as tertiary amines, alcohols and acids. These substances, which can be used as accelerators, have an influence on the formulation of the epoxy resin compound due to the amount added and their properties. A change in the proportions of components in the mortar compound usually results, however, in significant changes in the final properties of the cured mortar compound and often leads to problems in terms of the properties relevant to the application. In particular, a reduction in the load values of the cured mortar can often be observed in this case.

The use of amines which have amino groups on secondary carbon atoms, such as 3-aminomethyl-3,5,5-trimethylcyclohexan-1-amine (isophorone diamine, IPDA), as curing agents in mortar compounds based on epoxy amine is currently very limited because these mortar compounds have curing times of more than 24 hours. These long curing times are not practical on the construction site because they delay further work. It is expedient to accelerate the curing time in order to reduce the waiting times before the next work step. It would be desirable, accordingly, to be able to consider slow-curing amines when formulating mortar compounds, as this would make the property profile of a mortar compound more variable.

SUMMARY OF THE INVENTION

The problem addressed by the invention is therefore that of providing an epoxy resin compound which contains 3-aminomethyl-3,5,5-trimethylcyclohexan-1-amine and is suitable for fastening purposes. By comparison with conventional mortar compounds, the curing time is intended to be shorter with a comparably high pull-out strength. In particular, the problem addressed by the invention is that of providing an epoxy resin compound which, by comparison with conventional mortar compounds, has a shorter curing time and improved pull-out strength at elevated temperatures, for example in a temperature range of from 40° C. to 120° C. Furthermore, it is desirable for the epoxy resin compound to exhibit improved pull-out strength in water-filled boreholes by comparison with conventional mortar compounds based on epoxy amine.

The problem addressed by the invention is solved by providing a curing agent composition according to the below embodiments. Preferred embodiments of the curing agent composition according to the invention are provided below, which may optionally be combined with one another.

The invention further relates to an epoxy resin compound and to a multi-component epoxy resin system described in the embodiments below. Preferred embodiments of the epoxy resin compound according to the invention and of the multi-component epoxy resin system are provided in the description below, which may optionally be combined with one another.

The invention further relates to a method for the chemical fastening of construction elements in boreholes according to embodiments described below.

The invention also covers the use of at least one salt (S) as an accelerator in an epoxy resin compound according to the below embodiments.

DETAILED DESCRIPTION OF THE INVENTION

According to the invention, a curing agent composition for an epoxy resin compound is provided which comprises, as the curing agent, 3-aminomethyl-3,5,5-trimethylcyclohexan-1-amine and at least one further cycloaliphatic amine which is reactive to epoxy groups, with 3-aminomethyl-3,5,5-trimethylcyclohexan-1-amine being contained in the curing agent composition in a proportion of at least 10 wt. %, based on the total weight of all the amines reactive to epoxy groups. The curing agent composition also comprises at least one salt (S) as an accelerator, the salt (S) used as the accelerator being selected from the group consisting of salts of nitric acid, salts of nitrous acid, salts of halogens, salts of trifluoromethanesulfonic acid and combinations thereof.

The use of the curing agent composition according to the invention in an epoxy resin compound for fastening purposes leads to a considerable acceleration of the curing reaction. The cured compounds exhibit outstanding pull-out strength at elevated temperatures and can therefore be subjected to loading after only a short period of time, within approximately 4 to 6 hours, and sometimes even much earlier. The curing agent composition according to the invention and the epoxy resin compounds prepared therefrom are therefore particularly suitable for use in countries having high temperatures. Furthermore, the cured compounds exhibit excellent pull-out strength in the water-filled borehole.

Within the context of the invention, the terms used above and in the following description have the following meanings:

"aliphaticcompounds" are acyclic or cyclic, saturated or unsaturated carbon compounds, excluding aromatic compounds;

"cycloaliphatic compounds" are compounds having a carbocyclic ring structure, excluding benzene derivatives or other aromatic systems;

"araliphatic compounds" are aliphatic compounds having an aromatic backbone such that, in the case of a functionalized araliphatic compound, a functional group that is present is bonded to the aliphatic rather than the aromatic part of the compound;

"aromatic compounds" are compounds which follow Hückel's rule (4n+2);

"amines" are compounds which are derived from ammonia by replacing one, two or three hydrogen atoms with hydrocarbon groups, and have the general structures $RNH_2$ (primary amines), $R_2NH$ (secondary amines) and $R_3N$ (tertiary amines) (see: IUPAC Compendium of Chemical Terminology, 2nd ed. (the "Gold Book"), compiled by A. D. McNaught and A. Wilkinson, Blackwell Scientific Publications, Oxford (1997)): and "salts" are compounds that are made up of positively charged ions (cations) and negatively charged ions (anions). There are ionic bonds between these ions. The expression "salts of nitric acid" describes compounds which are derived from nitric acid ($HNO_3$) and which comprise a nitrate ($NO_3^-$) as an anion. The expression "salts of nitrous acid" describes compounds which are derived from nitrous acid ($HNO_2$) and which comprise a nitrite ($NO_2^-$) as an anion. The expression "salts of halogens" describes compounds which comprise an element from group 7 of the periodic table as an anion. In particular, the expression "salts of halogens" should be understood to mean compounds which comprise a fluoride ($F^-$), chloride ($Cl^-$), bromide ($Br^-$) or iodide ($I^-$) as an anion. The expression "salts of trifluoromethanesulfonic acid" describes compounds which are derived from trifluoromethanesulfonic acid ($CF_3SO_3H$) and which comprise a triflate ($CF_3SO_3^-$) as an anion. In the context of the present invention, the term "salt" also covers the corresponding hydrates of the salts. The salts (S) used as accelerators are also referred to as "salts" in the context of the present invention.

According to the invention, the curing agent composition comprises, as a curing agent, a combination containing 3-aminomethyl-3,5,5-timethylcyclohexan-1-amine and at least one further cycloaliphatic amine which is reactive to epoxy groups.

3-aminomethyl-3,5,5-timethylcyclohexan-1-amine is a cycloaliphatic amine which is also known under the name isophorone diamine or under the abbreviation IPDA. According to the invention, the curing agent composition comprises at least 10 wt. % 3-aminomethyl-3,5,5-trimethylcyclohexan-1-amine, based on the total weight of all the amines reactive to epoxy groups which are contained in the curing agent composition. The curing agent composition preferably comprises at least 25 wt. %, preferably at least 35 wt. %, and more preferably at least 50 wt. % 3-aminomethyl-3,5,5-trimethylcyclohexan-1-amine, based on the total weight of all the amines reactive to epoxy groups which are contained in the curing agent composition. In a preferred embodiment, the proportion of 3-aminomethyl-3,5,5-trimethylcyclohexan-1-amine in relation to the total weight of all the amines reactive to epoxy groups is 10 to 90 wt. %, more preferably 25 to 80 wt. %, and very particularly preferably 50 to 70 wt. %.

The at least one further cycloaliphatic amine which is reactive to epoxy groups is different from 3-aminomethyl-3,5,5-trimethylcyclohexan-1-amine. If a cycloaliphatic amine is used in the context of the present invention, this refers to the further cycloaliphatic amine which is reactive to epoxy groups and not to 3-aminomethyl-3,5,5-trimethylcyclohexan-1-amine. The cycloaliphatic amine preferably has on average at least two reactive hydrogen atoms per molecule which are bonded to a nitrogen atom. The cycloaliphatic amine preferably has at least one cyclohexyl group (cycloalkyl group with 6 carbon atoms).

Preferred cycloaliphatic amines are 4-methyl-cyclohexane-1,3-diamine, (bicyclo[2.2.1heptanebis(methyl-amine)) (PRO-NBDA), 1,2-diaminocyclohexane, 1,3-cyclohexane-bis(methyl-amine) (1,3-BAC) and 4,4'-methylenebis (cyclohexyl-amine) (PACM), with in particular 1,3-cyclohexane-bis(methyl-amine) and 4,4'-methylenebis (cyclohexyl-amine) being preferred.

The proportion of cycloaliphatic amine which is reactive to epoxy groups in relation to the total weight of all the amines reactive to epoxy groups in the curing agent composition is preferably ≥1 wt. % to 90 wt. %, more preferably 10 to 70 wt. %, even more preferably 30 to 50 wt. %.

The cycloaliphatic amine can be used both in isolation and in a mixture of two or more of the specified cycloaliphatic amines. In a preferred embodiment, the curing agent composition comprises 3-aminomethyl-3,5,5-timethylcyclohexan-1-amine and a further cycloaliphatic amine which is reactive to epoxy groups. This is preferably a further cycloaliphatic amine which is reactive to epoxy groups and is selected from 1,3-cyclohexane-bis(methyl-amine) and 4,4'-methylenebis(cyclohexyl-amine).

When 3-aminomethyl-3,5,5-trimethylcyclohexan-1-amine is combined with 1,3-cyclo-hexane-bis(methyl-amine) in the curing agent composition, it is preferred that 1,3-cyclohexane-bis(methyl-amine) is contained in a proportion of from 10 to 90 wt. %, preferably in a proportion of from 30 to 50 wt. %, in relation to the total weight of all the amines reactive to epoxy groups. When 3-aminomethyl-3,5,5-trimethylcyclohexan-1-amine is combined with 4,4'-methylenebis(cyclohexyl-amine) in the curing agent composition, it is preferred that 4,4'-methylenebis(cyclohexyl-amine) is contained in a proportion of from 10 to 80 wt. %, preferably in a proportion of from 30 to 50 wt. %, in relation to the total weight of all the amines reactive to epoxy groups.

In another preferred embodiment, the curing agent composition comprises 3-aminomethyl-3,5,5-trimethylcyclohexan-1-amine and more than one, preferably two further cycloaliphatic amines which are reactive to epoxy groups. It is preferred that at least one of the two cycloaliphatic amines is selected from 1,3-cyclohexane-bis(methyl-amine) and 4,4'-methylenebis(cyclohexyl-amine). The curing agent composition preferably comprises a combination of 3-aminomethyl-3,5,5-trimethylcyclohexan-1-amine with 1,3-cyclohexane-bis(methyl-amine) and 4,4'-methylenebis(cyclohexyl-amine).

In addition to the above-described combination containing 3-aminomethyl-3,5,5-trimethylcyclohexan-1-amine and at least one further cycloaliphatic amine which is reactive to epoxy groups, the curing agent composition may additionally comprise one or more amines which are reactive to epoxy groups, selected from the group consisting of aliphatic, alicyclic, araliphatic and aromatic amines. Amines which can be used accordingly are in principle known to a person skilled in the art. The amine is preferably a polyamine having at least two amino groups in the molecule. Particularly stable networking can be achieved when using polyamines in the curing agent composition.

Examples of suitable amines are given below: 1,2-diaminoethane(ethylenediamine), 1,2-propanediamine, 1,3-propanediamine, 1,4-diaminobutane, 2,2-dimethyl-1,3-propanediamine (neopentanediamine), diethylaminopropylamine (DEAPA), 2-methyl-1,5-diaminopentane, 1,3-diaminopentane, 2,2,4- or 2,4,4-trimethyl-1,6-diaminohexane and mixtures thereof (TMD), 1,2-bis(aminomethyl)cyclohexane, hexamethylenediamine (HMD), 1,4-diaminocyclohexane (1,4-DACH), bis(4-amino-3-methylcyclohexyl)methane, diethylenetriamine (DETA), 4-azaheptane-1,7-diamine, 1,11-diamino-3,6,9-trioxundecane, 1,8-diamino-3,6-dioxaoctane, 1,5-diaminomethyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis(3-aminopropyl)methylamine, triethylenetetramine (TETA), tetraethylenepentamine (TEPA), pentaethylenehexamine (PEHA), 1,3-benzenedimethanamine (m-xytylenediamine, mXDA), 1,4-benzenedimethanamine (p-xytylenediamine, pXDA), 5-(aminomethyl)bicyclo[[2.2.1]hept-2-yl]methylamine (NBDA, norbornane diamine), dimethyldipropylenetriamine, dimethylaminopropylaminopropylamine (DMAPAPA), diethylmethylbenzenediamine (DETDA), 4,4'-diaminodiphenylsulfone (dapsone), mixed polycyclic amines (MPCA) (e.g. Ancamine 2168), dimethyldiaminodicyclohexylmethane (Laromin C260), 2,2-bis(4-aminocyclohexyl)propane, (3(4),8(9)bis(aminomethyldicyclo[5.2.1.0$^{2,6}$]decane (mixture of isomers, tricyclic primary amines; TCD-diamine), methylcyclohexyl diamine (MCDA), N,N'-diaminopropyl-2-methyl-cyclohexane-1,3-diamine, N,N'-diaminopropyl-4-methyl-cyclohexane-1,3-diamine, N-(3-aminopropyl)cyclohexylamine, and 2-(2,2,6,6-tetramethylpiperdin-4-yl)propane-1,3-diamine. The above-mentioned amines can be contained in the curing agent composition in an amount of up to 20 wt. % based on the total weight of all the amines reactive to epoxy groups.

The proportion of all the amines reactive to epoxy groups in the curing agent composition is preferably from 30 to 98 wt. %, preferably from 40 to 98 wt. %, based on the total weight of the curing agent composition.

According to the invention, the curing agent composition contains at least one salt (S) as an accelerator. According to the invention, the salt (S) is at least one salt selected from the group consisting of salts of nitric acid, salts of nitrous acid, salts of halogens, salts of trifluoromethanesulfonic acid and combinations thereof. The salt (S) is preferably at least one salt selected from the group consisting of salts of nitric acid, salts of halogens, salts of trifluoromethanesulfonic acid and combinations thereof. It has been found to be particularly preferable for the salt (S) to be selected from the group consisting of nitrates ($NO_3^-$), iodides ($I^-$), triflates ($CF_3SO_3^-$) and combinations thereof.

Alkali metal nitrates, alkaline earth metal nitrates, lanthanide nitrates, aluminum nitrate, ammonium nitrate and mixtures thereof are particularly suitable salts of nitric acid. Corresponding salts of nitric acid are commercially available. Alkali metal nitrates and/or alkaline earth metal nitrates, such as $Ca(NO_3)_2$ or $NaNO_3$, are preferably used as salts of nitric acid. It is also possible to use a solution of a salt in nitric acid as the salt (S), for example a solution containing $Ca(NO_3)_2/HNO_3$. To prepare this solution, $CaCO_3$ is dissolved in $HNO_3$.

Alkali metal nitrites, alkaline earth metal nitrites, lanthanide nitrites, aluminum nitrite, ammonium nitrite and mixtures thereof are particularly suitable salts of nitrous acid. Corresponding salts of nitrous acid are commercially available. Alkali metal nitrites and/or alkaline earth metal nitrites, such as $Ca(NO_2)_2$, are preferably used as salts of nitrous acid.

Alkali metal halides, alkaline earth metal halides, lanthanide halides, aluminum halides, ammonium halides and mixtures thereof are particularly suitable salts of halogens. Corresponding salts of halogens are commercially available. The halogens are preferably selected from the group consisting of chloride, bromide, iodide and mixtures thereof, with iodides particularly preferably being used.

Alkali metal triflates, alkaline earth metal triflates, lanthanide triflates, aluminum triflate, ammonium triflate and mixtures thereof are particularly suitable salts of trifluoromethanesulfonic acid. Corresponding salts of trifluoromethanesulfonic acid are commercially available. Alkali metal nitrates and/or alkaline earth metal nitrates, such as $Ca(CF_3SO_3)_2$, are preferably used as salts of trifluoromethanesulfonic acid.

In principle, the cations of the salt (S) can be organic, inorganic or a mixture thereof. The cation of the salt (S) is preferably an inorganic cation.

Suitable organic cations are, for example, ammonium cations substituted with organic groups, such as $C_1$-$C_6$-alkyl groups, such as tetraethylammonium cations.

Suitable inorganic cations of the salt (S) are preferably cations selected from the group consisting of alkali metals, alkaline earth metals, lanthanides, aluminum, ammonium ($NH_4^+$) and mixtures thereof, more preferably from the group consisting of alkali metals, alkaline earth metals, aluminum, ammonium and mixtures thereof, and even more preferably from the group consisting of alkali metals, alkaline earth metals, aluminum and mixtures thereof. It is particularly preferable for the cation of the salt (S) to be selected from the group consisting of sodium, calcium, aluminum, ammonium and mixtures thereof.

The following compounds or components are therefore particularly suitable as the salt (S): $Ca(NO_3)_2$ (calcium nitrate, usually used as $Ca(NO_3)_2$ tetrahydrate), a mixture of $Ca(NO_3)_2/HNO_3$, $KNO_3$ (potassium nitrate), $NaNO_3$ (sodium nitrate), $Mg(NO_3)_2$ (magnesium nitrate, usually used as $Mg(NO_3)_2$ hexahydrate), $Al(NO_3)_3$ (aluminum nitrate, usually used as $Al(NO_3)_3$ nonahydrate), $NH_4NO_3$ (ammonium nitrate), $Ca(NO_2)_2$ (calcium nitrite), NaCl (sodium chloride), NaBr (sodium bromide), NaI (sodium iodide), $Ca(CF_3SO_3)_2$ (calcium triflate), $Mg(CF_3SO_3)_2$ (magnesium triflate), and $Li(CF_3SO_3)_2$ (lithium triflate).

The curing agent composition according to the invention can comprise one or more salts (S). The salts can be used both individually and in a mixture of two or more of the specified salts.

In order to improve the solubility properties of the salt (S) in the curing agent composition, the salt (S) can be dissolved in a suitable solvent and used accordingly as a solution. Organic solvents such as methanol, ethanol and glycerol, for example, are suitable for this purpose. However, water can also be used as the solvent, possibly also in a mixture with the above-mentioned organic solvents. In order to prepare the corresponding salt solutions, the salt (S) is added to the solvent and stirred, preferably until it is completely dissolved.

The salt (S) is preferably contained in the curing agent composition in a proportion of from 0.1 to 15 wt. %, based on the total weight of the curing agent composition. The salt (S) is preferably contained in the curing agent composition in a proportion of from 0.5 to 12 wt. %, more preferably in a proportion of from 1.0 to 10.0 wt. %, even more preferably in a proportion of from 1.5 to 8.0 wt. %, based on the total weight of the curing agent composition.

In a further embodiment, the curing agent composition comprises further additives from the group of solvents, phenolic accelerators, co-accelerators, adhesion promoters and inorganic fillers.

Non-reactive diluents (solvents) may preferably be contained in amount of up to 30 wt. %, based on the total weight of the curing agent composition, for example from 1 to 20 wt. %. Examples of suitable solvents are alcohols, such as methanol, ethanol or glycols, lower alkyl ketones such as acetone, di lower alkyl lower alkanoyl amides such as dimethylacetamide, lower alkyl benzenes such as xylenes or toluene, phthalic acid esters or paraffins. The amount of solvents is preferably ≤5 wt. %, based on the total weight of the curing agent composition.

The phenolic accelerators are preferably selected from salicylic acid, styrenated phenols and cardanol and mixtures thereof. These may be present in the curing agent composition in a proportion of from 0 to 10 wt. %, based on the total weight of the curing agent composition.

Benzene alcohol, tertiary amines, imidazoles or tertiary aminophenols, organophosphines, Lewis bases or acids such as phosphoric acid esters, or mixtures of two or more thereof, can be used as co-accelerators, for example. The co-accelerators may also be present in the epoxy resin component (A) if they are compatible with the epoxy resins.

The co-accelerators are preferably contained in the curing agent composition in a weight proportion of from 0.001 to 5 wt. %, based on the total weight of the curing agent composition.

Examples of suitable co-accelerators are in particular tris-2,4,6-dimethylaminomethylphenol, 2,4,6-tris(dimethylamino)phenol and bis[(dimethylamino)methyl]phenol. A suitable co-accelerator mixture contains 2,4,6-tris(dimethylaminomethyl)phenol and bis(dimethylaminomethyl)phenol. Mixtures of this kind are commercially available, for example as Ancamine® K54 (Evonik, Germany).

By using an adhesion promoter, the cross-linking of the borehole wall with the mortar compound is improved such that the adhesion increases in the cured state. Suitable adhesion promoters are selected from the group of silanes that have at least one Si-bound hydrolyzable group, such as 3-glycidoxypropyltrimethoxysilane, 3-glycidoxypropyltriethoxysilane, 2-(3,4-epoxycyclohexyl)ethyltrimethoxysilane, N-2-(aminoethyl)-3-aminopropylmethyl-diethoxysilane, N-2-(aminoethyl)-3-aminopropyl-triethoxysilane, 3-aminopropyl-trimethoxysilane, 3-aminopropyltriethoxysilane, N-phenyl-3-aminoethyl-3-aminopropyl-trimethoxysilane, 3-mercaptopropyltrimethoxysilane and 3-mercaptopropylmethyldimethoxysilane. In particular, 3-aminopropyl-trimethoxysilane (AMMO), 3-aminopropyltriethoxysilane (AMEO), 2-aminoethyl-3-aminopropyl-trimethoxysilane (DAMO) and trimethoxysilylpropyldiethylenetetramine (TRIAMO) are preferred as adhesion promoters. Further silanes are described, for example, in EP3000792 A1, the content of which is hereby incorporated in the present application.

The adhesion promoter can be contained in an amount of up to 10 wt. %, preferably from 0.1 to 5 wt. %, more preferably from 1.0 to 2.5 wt. %, based on the total weight of the curing agent composition.

Inorganic fillers, in particular cements such as Portland cement or aluminate cement and other hydraulically setting inorganic substances, quartz, glass, corundum, porcelain, earthenware, baryte, light spar, gypsum, talc and/or chalk and mixtures thereof are used as fillers. In addition, thickeners such as fumed silica can also be used as an inorganic filler. Particularly suitable fillers are quartz powders, fine quartz powders and ultra-fine quartz powders that have not been surface-treated, such as Millisil W3, Millisil W6, Millisil W8 and Millisil W12, preferably Millisil W12. Silanized quartz powders, fine quartz powders and ultra-fine quartz powders can also be used. These are commercially available, for example, from the Silbond product series from Quarzwerke. The product series Silbond EST (modified with epoxysilane) and Silbond AST (treated with aminosilane) are particularly preferred. Furthermore, it is possible for fillers based on aluminum oxide such as aluminum oxide ultra-fine fillers of the ASFP type from Denka, Japan ($d_{50}$=0.3 μm) or grades such as DAW or DAM with the type designations 45 ($d_{50}$<0.44 μm), 07 ($d_{50}$>8.4 μm), 05 ($d_{50}$<5.5 μm) and 03 ($d_{50}$<4.1 μm). Moreover, the surface-treated fine and ultra-fine fillers of the Aktisil AM type (treated with aminosilane, $d_{50}$=2.2 μm) and Aktisil EM (treated with epoxysilane, d50=2.2 μm) from Hoffman Mineral can be used.

The inorganic fillers can be added in the form of sands, flours, or molded bodies, preferably in the form of fibers or balls. The fillers can be present in one or all components of the multi-component epoxy resin system described below. A suitable selection of the fillers with regard to type and particle size distribution/(fiber) length can be used to control properties relevant to the application, such as rheological behavior, press-out forces, internal strength, tensile strength, pull-out forces and impact strength.

The proportion of fillers is preferably from 0 to 75 wt. %, for example from 10 to 75 wt. %, preferably from 15 to 75 wt. %, more preferably from 20 to 50 wt. %, and even more preferably from 25 to 40 wt. %, based on the total weight of the curing agent composition.

The present invention further relates to an epoxy resin compound which comprises at least one curable epoxy resin and a curing agent composition as described above. The epoxy resin compound is preferably a multi-component epoxy resin compound, more preferably a two-component epoxy resin compound.

A large number of the compounds known to a person skilled in the art and commercially available for this purpose which contain on average more than one epoxy group, preferably two epoxy groups, per molecule can be used as a curable epoxy resin. These epoxy resins may be both saturated and unsaturated as well as aliphatic, alicyclic, aromatic or heterocyclic, and may also have hydroxyl groups. They may also contain substituents which do not cause disruptive secondary reactions under the mixing or reaction conditions, for example alkyl or aryl substituents, ether groups and the like. Trimeric and tetrameric epoxies are also suitable in the context of the invention.

The epoxy resins are preferably glycidyl ethers which are derived from polyhydric alcohols, in particular from polyhydric phenols such as bisphenols and novolacs, in particular those having an average glycidyl group functionality of 1.5 or greater, in particular 2 or greater, for example from 2 to 10.

The epoxy resins can have an epoxy equivalent weight (EEW) of from 120 to 2000 g/EQ, preferably from 140 to 400, in particular from 155 to 195, for example from 165 to 185. Mixtures of a plurality of epoxy resins may also be used.

Examples of the polyhydric phenols used to prepare the epoxy resins are resorcinol, hydroquinone, 2,2-bis-(4-hydroxyphenyl)propane (bisphenol A), isomer mixtures of dihydroxyphenylmethane (bisphenol F), tetrabromobisphenol A, novolacs, 4,4'-dihydroxyphenylcyclohexane and 4,4'-dihydroxy-3,3'-dimethyldiphenylpropane.

The epoxy resin is preferably a diglycidyl ether of bisphenol A or bisphenol F or a mixture thereof. Liquid diglycidyl ethers based on bisphenol A and/or F having an EEW of from 150 to 300 g/EQ are particularly preferably used.

Further examples are hexanediol diglycidyl ether, trimethylolpropane triglycidyl ether, bisphenol A epichlorohydrin resins and/or bisphenol F epichlorohydrin resins, for example having an average molecular weight of Mn≤2000 g/mol.

The present invention also relates to a multi-component epoxy resin system comprising an epoxy resin component (A) and a curing agent component, the epoxy resin component (A) containing a curable epoxy resin, and the curing agent component containing 3-aminomethyl-3,5,5-trimethylcyclohexan-1-amine and at least one further cycloaliphatic amine which is reactive to epoxy groups, with 3-aminomethyl-3,5,5-trimethylcyclohexan-1-amine being contained in a proportion of at least 10 wt. % based on the total weight of all the amines reactive to epoxy groups, and at least one salt (S) selected from salts of nitric acid, salts of nitrous acid, salts of halogens, salts of trifluoromethanesulfonic acid and combinations thereof being contained in the epoxy resin component (A) and/or in the curing agent component. The multi-component epoxy resin system is preferably a two-component epoxy resin system.

The above statements apply to the curable epoxy resin, the further cycloaliphatic amine which is reactive to epoxy groups and the salt (S) of the multi-component epoxy resin system.

The salt (S) used as an accelerator can be contained in the epoxy resin component (A) or in the curing agent component or in both the epoxy resin component (A) and the curing agent component. It is preferable for the salt (S) to be contained at least in the curing agent component, preferably only in the curing agent component. In this case, the curing agent composition described above is used in the multi-component epoxy resin system.

The proportion of epoxy resin in the epoxy resin component (A) is >0 to 100 wt. %, preferably 10 to 70 wt. % and particularly preferably 30 to 60 wt. %, based on the total weight of the epoxy resin component (A).

The epoxy resin component (A) may optionally contain at least one reactive diluent. Glycidyl ethers of aliphatic, alicyclic or aromatic monoalcohols or in particular polyalcohols having a lower viscosity than epoxies containing aromatic groups are used as reactive diluents. Examples of reactive diluents are monoglycidyl ethers, e.g. o-cresyl glycidyl ether, and glycidyl ethers having an epoxide functionality of at least 2, such as 1,4-butanediol diglycidyl ether (BDDGE), cyclohexanedimethanol diglycidyl ether and hexanediol diglycidyl ether, as well as tri- or higher glycidyl ethers, such as glycerol triglycidyl ether, pentaerythritol tetraglycidyl ether, trimethylolpropane triglycidyl ether (TMPTGE), or trimethylolethane triglycidyl ether (TMETGE), with trimethylolethane triglycidyl ether being preferred. Mixtures of two or more of these reactive diluents can also be used, preferably mixtures containing triglycidyl ethers, particularly preferably as a mixture of 1,4-butanediol diglycidyl ether (BDDGE) and trimethylolpropane triglycidyl ether (TMPTGE) or 1,4-butanediol diglycidyl ether (BDDGE) and trimethylolethane triglycidyl ether (TMETGE).

The reactive diluents are preferably present in an amount of from 0 to 60 wt. %, in particular from 1 to 20 wt. %, based on the total weight of the epoxy resin component (A).

The proportion of the epoxy resin component (A) in the total mass of the multi-component epoxy resin system is preferably from 5 to 90 wt. %, in particular from 20 to 80 wt. %, from 30 to 70 wt. % or from 40 to 60 wt. %.

Suitable epoxy resins and reactive diluents can also be found in the standard reference from Michael Dombusch, Ulrich Christ and Rob Rasing, "Epoxidharze," Vincentz Network GmbH & Co. KG (2015), ISBN 13: 9783866308770. These compounds are included here by reference.

Furthermore, the epoxy resin component (A) can contain conventional additives, in particular adhesion promoters and fillers, as already described for the curing agent composition.

The adhesion promoter can be contained in an amount of up to 10 wt. %, preferably from 0.1 to 5 wt. %, particularly preferably from 1.0 to 5.0 wt. %, based on the total weight of the epoxy resin component (A).

The proportion of fillers is preferably from 0 to 75 wt. %, for example from 10 to 75 wt. %, preferably from 15 to 75 wt. %, more preferably from 20 to 50 wt. %, and even more preferably from 25 to 40 wt. %, based on the total weight of the epoxy resin component (A).

Further conceivable additives to the epoxy resin component (A) are also thixotropic agents such as optionally organically after-treated fumed silica, bentonites, alkyl- and methylcelluloses and castor oil derivatives, plasticizers such as phthalic or sebacic acid esters, stabilizers, antistatic agents, thickeners, flexibilizers, curing catalysts, rheology aids, wetting agents, coloring additives such as dyes or pigments, for example for different staining of components for improved control of their mixing, as well as wetting agents, desensitizing agents, dispersants and other control agents for the reaction rate, or mixtures of two or more thereof.

The mufti-component epoxy resin system is preferably present in cartridges or film pouches which are characterized in that they comprise two or more separate chambers in which the epoxy resin component (A) and the curing agent component, preferably the curing agent composition (B), are separately arranged so as to prevent a reaction.

For the use as intended of the multi-component epoxy resin system, the epoxy resin component (A) and the curing agent component are discharged out of the separate chambers and mixed in a suitable device, for example a static mixer or dissolver. The mixture of epoxy resin component (A) and curing agent component is then introduced into the previously cleaned borehole by means of a known injection device. The component to be fastened is then inserted into the mortar compound and aligned. The reactive constituents of the curing agent component react with the epoxy resins of the resin component (A) by polyaddition such that the epoxy resin compound cures under environmental conditions within a desired period of time, preferably within minutes or hours.

Components A and B are preferably mixed in a ratio that results in a balanced stoichiometry according to the EEW and AHEW values.

The AHEW value (amine hydrogen equivalent weight, H equivalent) provides the amount of the curing agent composition which contains 1 mol of reactive H. The AHEW is determined in a manner known to a person skilled in the art on the basis of the formulation of the reaction mixture from the known H equivalents of the used reactants and raw materials from which they are calculated.

Using the example of meta-xytylenediamine ($M_W$=136 g/mol, functionality=4 eq/mol), the calculation of the AHEW is explained below by way of example:

$$\text{General formula: } AHEW = \frac{Mw}{\text{Functionality}} = \frac{136}{4}\left[\frac{g}{eq}\right] = 34\left[\frac{g}{eq}\right]$$

The EEW (epoxide equivalent weight, epoxide equivalent values) are generally provided by the manufacturers of the epoxy resin components used in each case or are calculated according to known methods. The EEW values provide the amount in g of epoxy resin which contains 1 mol of epoxy groups.

Experimentally, the AHEW was obtained by determining the glass transition temperature (Tg) from a mixture of epoxy resin (with known EEW) and an amine component. In this case, the glass transition temperatures of epoxy resin/ amine mixtures were determined with different ratios. The sample was cooled at a heating rate of –20 K/min from 21 to –70° C., heated in a first heating cycle to 250° C. (heating rate 10 K/min), then re-cooled to –70° C. (heating rate –20 K/min) and heated (20 K/min) to 200° C. in the last step. The mixture having the highest glass transition temperature in the second heating cycle ("$T_g2$") has the optimum ratio of epoxy resin and amine. The AHEW value can be calculated from the known EEW and the optimum epoxy resin/amine ratio.

Example: EEW=158 g/mol

Amine/epoxy resin mixture having a maximum $T_g2$: 1 g amine with 4.65 g epoxy resin $$AHEW = \frac{1}{4.65} \cdot 158 = 34\left[\frac{g}{eq}\right]$$

The epoxy resin compound according to the invention or the multi-component epoxy resin system according to the invention is preferably used for construction purposes. The expression "for construction purposes" refers to the structural adhesion of concrete/concrete, steel/concrete or steel/steel or one of said materials with other mineral materials, to the structural strengthening of components made of concrete, brickwork and other mineral materials, to reinforcement applications with fiber-reinforced polymers of building objects, to the chemical fastening of surfaces made of concrete, steel or other mineral materials, in particular the chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. Most particularly preferably, the epoxy resin compounds according to the invention and the multi-component epoxy resin systems according to the invention are used for chemically fastening anchoring means.

The present invention also relates to a method for the chemical fastening of construction elements in boreholes, an epoxy resin compound according to the invention or a multi-component epoxy resin system according to the invention being used as described above for the chemical fastening of the construction elements. The method according to the invention is particularly suitable for the structural adhesion of concrete/concrete, steel/concrete or steel/steel or one of said materials with other mineral materials, for the structural strengthening of components made of concrete, brickwork and other mineral materials, for reinforcement applications with fiber-reinforced polymers of building objects, for the chemical fastening of surfaces made of concrete, steel or other mineral materials, in particular the chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. The method according to the invention is very particularly preferably used for the chemical fastening of anchoring means.

The present invention also relates to the use of at least one salt (S) selected from the group consisting of salts of nitric acid, salts of nitrous acid, salts of halogens, salts of trifluoromethanesulfonic acid and combinations thereof as an accelerator in an epoxy resin compound for the chemical fastening of construction elements, in particular for anchoring fastening elements in boreholes. The epoxy resin compound comprises 3-aminomethyl-3,5,5-trimethylcyclohexan-1-amine, preferably in a proportion of least 10 wt. % based on the total weight of all the amines reactive to epoxy groups, and at least one further cycloaliphatic amine which is reactive to epoxy groups. It is preferable for the epoxy resin compound to be in the form of a multi-component epoxy resin system which comprises the epoxy resin component (A) described above and the curing agent component. It is also preferable for the salt (S) to be contained in the curing agent component and thus for a curing agent composition (B) as described above to be used.

The use of at least one salt (S) within the meaning of the present invention as an accelerator in an epoxy resin compound, in particular in a multi-component epoxy resin system, makes it possible to considerably shorten the curing time of the epoxy resin compound and furthermore to ensure sufficient pull-out strength after only four to six hours. Furthermore, the cured epoxy resin compound has excellent pull-out strength at elevated temperatures and in the water-filled borehole.

The present invention also relates to the use of at least one salt (S) selected from the group consisting of salts of nitric acid, salts of nitrous acid, salts of halogens, salts of trifluoromethanesulfonic acid and combinations thereof as an accelerator in an epoxy resin compound, in particular in a multi-component epoxy resin system. The epoxy resin compound comprises 3-aminomethyl-3,5,5-trimethylcyclohexan-1-amine, preferably in a proportion of least 10 wt. % based on the total weight of all the amines reactive to epoxy groups, and at least one further cycloaliphatic amine which is reactive to epoxy groups. It is preferable for the epoxy resin compound to be in the form of a multi-component epoxy resin system which comprises the epoxy resin component (A) and curing agent component described above. It is also preferable for the salt (S) to be contained in the curing agent component and thus for a curing agent composition (B) to be used.

The use of at least one salt (S) within the meaning of the present invention as an accelerator in an epoxy resin compound, in particular in a multi-component epoxy resin compound and more preferably in the curing agent component of the multi-component epoxy resin compound, makes it possible in particular to increase the pull-out strength of the epoxy resin compound at elevated temperatures, for example in a temperature range of from 40° C. to 120° C.

Furthermore, the use of at least one salt (S) within the meaning of the present invention as an accelerator in an epoxy resin compound, in particular in a multi-component epoxy resin compound and more preferably in the curing agent component of the multi-component epoxy resin compound, makes it possible to increase the pull-out strength of the epoxy resin compounds in water-filled boreholes.

Further advantages of the invention can be found in the following description of preferred embodiments, which are not understood to be in any way limiting, however. All embodiments of the invention can be combined with one another within the scope of the invention.

EXAMPLES

Epoxy Resin Component (A)
Starting Materials

In the examples, the bisphenol A-based and bisphenol F-based epoxy resins commercially available under the names Araldite GY 240 and Araldite GY 282 (Huntsman), respectively, were used as the epoxy resins.

The 1,4-butanediol-diglycidyl ether and trimethylolpropane-triglycidyl ether commercially available under the names Araldite DY-206 and Araldite™ DY-T (Huntsman), respectively, were used as the reactive diluents.

3-glycidyloxypropyl-trimethoxysysilane available under the name Dynalsylan GLYMO™ (Evonik Industries) was used as the adhesion promoter.

The liquid components were premixed by hand. Subsequently, quartz (Millisil™ W12 from Quarzwerke Frechen) was added as a filler and fumed silica (Cab-O-Sil™ TS-720 from Cabot Rheinfelden) was added as a thickener and the mixture was stirred in the dissolver (PC laboratory system, volume 1 L) for 10 minutes at a negative pressure of 80 mbar at 3500 rpm.

The composition of the epoxy resin components A1 to A17 used in the examples is given in table 1 below.

TABLE 1

Composition of the epoxy resin components A1 to A17 in wt. %

| | Bisphenol A-based epoxy resin | Bisphenol F-based epoxy resin | 1,4-butanediol-diglycidyl ether | Trimethylolpropane-triglycidyl ether | 3-glycidyl-oxypropyl-trimethoxysilane | Quartz | Silicic acid | EEW [g/Eq] |
|---|---|---|---|---|---|---|---|---|
| A1 | 25.2 | 13.6 | 4.9 | 4.9 | 2.8 | 45.9 | 2.7 | 314 |
| A2 | 25.0 | 13.4 | 4.8 | 4.8 | 2.8 | 46.5 | 2.7 | 317 |
| A3 | 26.0 | 14.0 | 5.0 | 5.0 | 2.8 | 44.5 | 2.7 | 305 |
| A4 | 27.0 | 14.6 | 5.2 | 5.2 | 2.8 | 42.5 | 2.7 | 293 |
| A5 | 29.2 | 15.7 | 5.6 | 5.6 | 3.4 | 37.8 | 2.7 | 271 |
| A6 | 30.4 | 16.4 | 5.9 | 5.9 | 3.4 | 35.3 | 2.7 | 260 |
| A7 | 27.0 | 14.6 | 5.2 | 5.2 | 2.8 | 42.5 | 2.7 | 293 |
| A8 | 28.1 | 15.1 | 5.4 | 5.4 | 2.8 | 40.5 | 2.7 | 282 |
| A9 | 28.9 | 15.6 | 5.6 | 5.6 | 2.8 | 38.8 | 2.7 | 275 |
| A10 | 29.6 | 16.0 | 5.7 | 5.7 | 2.8 | 37.5 | 2.7 | 268 |
| A11 | 31.2 | 16.8 | 6.0 | 6.0 | 3.4 | 33.9 | 2.7 | 254 |
| A12 | 31.2 | 16.8 | 6.0 | 6.0 | 2.8 | 34.5 | 2.7 | 255 |
| A13 | 28.2 | 15.2 | 5.4 | 5.4 | 2.8 | 40.3 | 2.7 | 282 |
| A14 | 26.3 | 14.1 | 5.1 | 5.1 | 2.8 | 43.9 | 2.7 | 302 |
| A15 | 32.0 | 17.2 | 6.2 | 6.2 | 2.8 | 32.9 | 2.7 | 249 |
| A16 | 24.9 | 13.4 | 4.8 | 4.8 | 2.8 | 46.6 | 2.7 | 318 |
| A17 | 31.3 | 16.9 | 6.0 | 6.0 | 2.8 | 34.3 | 2.7 | 255 |

The composition of the epoxy resin components VA1 to VA7 used in the comparative examples is given in table 2 below.

TABLE 2

Composition of the epoxy resin components VA1 to VA7 in wt. %

| | Bisphenol A-based epoxy resin | Bisphenol F-based epoxy resin | 1,4-butanediol-diglycidyl ether | Trimethylolpropane-triglycidyl ether | 3-glycidyl-oxypropyl-trimethoxysilane | Quartz | Silicic acid | EEW [g/Eq] |
|---|---|---|---|---|---|---|---|---|
| VA1 | 28.3 | 15.3 | 5.5 | 5.5 | 2.8 | 39.9 | 2.7 | 280 |
| VA2 | 26.5 | 14.3 | 5.1 | 5.1 | 2.8 | 43.5 | 2.7 | 299 |
| VA3 | 32.8 | 17.6 | 6.3 | 6.3 | 2.8 | 31.5 | 2.7 | 244 |
| VA4 | 31.5 | 16.9 | 6.1 | 6.1 | 2.8 | 33.9 | 2.7 | 253 |
| VA5 | 31.2 | 16.8 | 6.0 | 6.0 | 3.4 | 33.9 | 2.7 | 254 |
| VA6 | 31.3 | 16.9 | 6.0 | 6.0 | 2.8 | 34.3 | 2.7 | 255 |
| VA7 | 31.3 | 16.9 | 6.0 | 6.0 | 2.8 | 34.3 | 2.7 | 254 |

Curing Agent Composition (B)

Starting Materials 3-aminomethyl-3,5,5-timethylcyclohexan-1-amine (isophorone diamine, IPDA) from Evonik Degussa, Germany, 1,3-cyclohexanedimethanamine (1,3-BAC) and m-xylylenediamine (mXDA) from MGC, Japan, 1,2-diaminocyclohexane (Dytek DCH-99) from Invista, 2-piperazino-ethylamine (N-AEP) and 4,4'-methylenebis(cyclohexylamine) (PACM) from Sigma Aldrich Germany, methylcyclohexanediamine (Baxxodur EC 210) from BASF SE, Germany, bicyclo[2.2.1]heptanebis(methyl-amine) (PRO-NBDA) from Mitsui Chemicals, Japan and 2-methypentamethylenediamine (DytekA) from Invista, the Netherlands, were used as amines for the preparation of the curing agent composition (B).

3-aminopropyl-triethoxysilane, which is available under the trade name Dynasylan AMEO from Evonik Degussa, was used as an adhesion promoter.

Quartz (Millisil™ W12 from Quarzwerke Frechen) and calcium aluminate cement (Secar 80 from Kemeos SA) were used as a filler and fumed silica (Cab-O-Sil™ TS-720 from Cabot Rheinfelden) was used as a thickener.

The constituents given in table 3 below were used to prepare the salts (S) used in the curing agent composition B.

TABLE 3

List of salts and accelerator components used (examples and comparative examples)

| Salt (S) or accelerator | Trade name | Manufacturer |
|---|---|---|
| Calcium nitrate | Calcium nitrate tetrahydrate | Sigma-Aldrich |
| Calcium carbonate | Calcium carbonate | Sigma-Aldrich |
| Nitric acid 70% | Nitric acid | Sigma-Aldrich |
| Calcium triflate | Calcium trifluoromethanesulfonate | Sigma-Aldrich |
| 2,4,6-tris(dimethylamino-methyl)phenol, bis[(dimethylamino)methyl]phenol | Ancamine K54 | Evonik |
| Styrenated phenol | Novares LS 500 | Rütgers Novares GmbH |
| Phenol novolac | Supraplast 3616 | Süd-West Chemie |

The salt calcium nitrate was used as a solution in glycerol (1,2,3-propanetriol, CAS No. 56-81-5, Merck, G). For this purpose, 400.0 g calcium nitrate tetrahydrate was added to 100 g glycerol and stirred at 50° C. until completely dissolved (approx. 3 hours). The solution prepared in this way contained 80.0% calcium nitrate tetrahydrate.

Calcium triflate was dissolved as a solid in the amine of the particular curing agent.

A calcium nitrate/nitric acid solution (calcium nitrate/nitric acid) was also used as an accelerator. To prepare this solution, 52.6 g calcium carbonate was slowly added to 135.2 g nitric acid and then stirred for 5 minutes.

The liquid components were mixed to prepare the curing agent compositions (B). The salt was added and quartz powder and silicic acid were then added and stirred in the dissolver (PC laboratory system, volume 1 L) for 10 minutes at a negative pressure of 80 mbar at 2500 rpm.

The composition of the curing agent compositions (B) prepared in this way is specified in tables 4 to 8 (according to the invention) and 9 (comparative examples) below.

In the curing agent compositions B2 to B10 (table 4), a combination of IPDA and 1,3-BAC was used as the curing agent and combined with different salts (S).

TABLE 4

Composition of the curing agent compositions B1 to B10 in wt. %;

| | IPDA | 1,3-BAC | Calcium nitrate | Calcium nitrate/Nitric acid | Calcium triflate | Adhesion promoter | Quartz | Filler | Thickener | AHEW [g/Eq] |
|---|---|---|---|---|---|---|---|---|---|---|
| B1 | 44.7 | — | 7.5 | — | — | 1.5 | 20.5 | 20.8 | 5.0 | 94 |
| B2 | 18.4 | 18.3 | 7.5 | — | — | 1.5 | 23.5 | 25.8 | 5.0 | 104 |
| B3 | 19.0 | 19.0 | 6.25 | — | — | 1.5 | 23.5 | 25.75 | 5.0 | 101 |
| B4 | 19.6 | 19.6 | 5.0 | — | — | 1.5 | 23.5 | 25.8 | 5.0 | 98 |
| B5 | 21.0 | 21.0 | 3.75 | — | — | — | 23.5 | 25.75 | 5.0 | 92 |
| B6 | 21.7 | 21.6 | 2.5 | — | — | — | 23.5 | 25.7 | 5.0 | 90 |
| B7 | 20.1 | 20.1 | — | 4.0 | — | 1.5 | 23.5 | 25.8 | 5.0 | 95 |
| B8 | 20.6 | 20.6 | — | 3.0 | — | 1.5 | 23.5 | 25.8 | 5.0 | 93 |
| B9 | 20.6 | 20.6 | — | — | 3.0 | 1.5 | 23.5 | 25.8 | 5.0 | 93 |
| B10 | 21.1 | 21.1 | — | — | 2.0 | 1.5 | 23.5 | 25.8 | 5.0 | 91 |

Calcium nitrate was used as the salt (5) in the curing agent compositions B11 to B15 and the ratio of IPDA to 1,3-BAC was varied.

TABLE 5

Composition of the curing agent compositions B11 to B15 [wt. %]: Variation of the ratio of IPDA and 1,3-BAC

|  | IPDA | 1,3-BAC | Calcium nitrate | Quartz | Filler | Thickener | AHEW [g/Eq] |
|---|---|---|---|---|---|---|---|
| B11 | 42.0 | — | 3.7 | 23.5 | 25.8 | 5.0 | 101 |
| B12 | 33.6 | 8.4 | 3.7 | 23.5 | 25.8 | 5.0 | 93 |
| B13 | 25.2 | 16.8 | 3.7 | 23.5 | 25.8 | 5.0 | 94 |
| B14 | 16.8 | 25.2 | 3.7 | 23.5 | 25.8 | 5.0 | 91 |
| B15 | 8.4 | 33.6 | 3.7 | 23.5 | 25.8 | 5.0 | 88 |

In the curing agent compositions B16 to B20, IPDA was combined with different cycloaliphatic amines.

TABLE 6

Composition of the curing agent compositions B11 to B20 [wt. %]

|  | IPDA | 1,3-BAC | Baxxodur EC210 | PRO-NBDA | Dytek DCH-99 | Calcium nitrate | Ancamin K54 | Adhesion promoter | Quartz | Filler | Thickener | AHEW [g/Eq] |
|---|---|---|---|---|---|---|---|---|---|---|---|---|
| B16 | 27.9 | 27.8 | — | — | — | 7.50 | — | 1.5 | 16.0 | 13.0 | 4.3 | 69 |
| B17 | 25.4 | 25.3 | — | — | — | 7.50 | 5.0 | 1.5 | 18.0 | 13.0 | 4.3 | 76 |
| B18 | 19.0 | — | 19.0 | — | — | 8.8 | — | 1.5 | 22.5 | 24.2 | 5.0 | 95 |
| B19 | 20.0 | — | — | 20.0 | — | 6.25 | — | 1.5 | 22.5 | 24.75 | 5.0 | 100 |
| B20 | 19.3 | — | — | — | 19.2 | 11.25 | — | 1.5 | 21.5 | 22.25 | 5.0 | 88 |

Calcium nitrate was used as the salt (5) in the curing agent compositions B21 to B24 and the ratio of IPDA to PACM was varied.

TABLE 7

Composition of the curing agent compositions B21 to B24 [wt. %]: Variation of the IPDA/PACM ratio

|  | IPDA | PACM | Calcium nitrate | Quartz | Filler | Thickener | AHEW [g/Eq] |
|---|---|---|---|---|---|---|---|
| B21 | 46.6 | 11.6 | 5.0 | 19.5 | 13.0 | 4.3 | 76 |
| B22 | 34.9 | 23.3 | 5.0 | 19.5 | 13.0 | 4.3 | 79 |
| B23 | 23.3 | 34.9 | 5.0 | 19.5 | 13.0 | 4.3 | 83 |
| B24 | 11.6 | 46.6 | 5.0 | 19.5 | 13.0 | 4.3 | 86 |

TABLE 8

Composition of the curing agent compositions B25 to B26 [wt. %]

|  | IPDA | PACM | Calcium nitrate | Calcium nitrate/ Nitric acid solution | Adhesion promoter | Quartz | Filler | Thickener | AHEW [g/Eq] |
|---|---|---|---|---|---|---|---|---|---|
| B25 | 26.9 | 26.0 | 8.8 | — | 1.5 | 19.0 | 13.5 | 4.3 | 88 |
| B26 | 42.0 | — | — | 3.0 | — | 25.0 | 25.0 | 5.0 | 101 |

The composition of the curing agent compositions VB1 to VB10 used in the comparative examples is given in table 9 below.

TABLE 9

Composition of the curing agent compositions VB1 to VB10 [wt. %]

|  | IPDA | mXDA | N-AEP | DytekA | 1,3-BAC | Calcium nitrate | Ancamin 54 | Styrenated phenol | Novolac | Adhesion promoter | Quartz | Filler | Thickener | AHEW [g/Eq] |
|---|---|---|---|---|---|---|---|---|---|---|---|---|---|---|
| VB1 | 19.0 | 19.0 | — | — | — | 6.25 | — | — | — | 1.5 | 23.5 | 25.7 | 5.0 | 98 |
| VB2 | 22.3 | — | 22.2 | — | — | 3.75 | — | — | — | 1.5 | 21.5 | 23.7 | 5.0 | 95 |
| VB3 | 20.3 | — | — | 20.2 | — | 3.75 | — | — | — | 1.5 | 23.5 | 25.7 | 5.0 | 84 |
| VB4 | 22.1 | 22.1 | — | — | — | — | — | — | — | 1.5 | 23.5 | 25.8 | 5.0 | 87 |

TABLE 9-continued

Composition of the curing agent compositions VB1 to VB10 [wt. %]

| | IPDA | mXDA | N-AEP | DytekA | 1,3-BAC | Calcium nitrate | Ancamin 54 | Styrenated phenol | Novolac | Adhesion promoter | Quartz | Filler | Thickener | AHEW [g/Eq] |
|---|---|---|---|---|---|---|---|---|---|---|---|---|---|---|
| VB5 | — | — | — | — | 42.0 | 3.7 | — | — | — | — | 23.5 | 25.8 | 5.0 | 85 |
| VB8 | — | 41.2 | — | — | — | 3.8 | — | — | — | — | 25.0 | 25.0 | 5.0 | 83 |
| VB7 | 41.8 | — | — | — | — | — | 2.4 | — | — | 1.5 | 29.7 | 20.3 | 4.3 | 68 |
| VB8 | 34.2 | — | — | — | — | — | 2.4 | 7.6 | — | 1.5 | 29.7 | 20.3 | 4.3 | 83 |
| VB9 | 34.2 | — | — | — | — | — | 2.4 | 7.6 | 3.0 | 1.5 | 26.7 | 20.3 | 4.3 | 83 |
| VB10 | 31.8 | — | — | — | — | — | 2.4 | — | 10.0 | 1.5 | 29.7 | 20.3 | 4.3 | 89 |

Mortar Compounds and Pull-Out Tests

The epoxy resin component (A) and the curing agent composition (B) were each used from a 3:1 hard cartridge. For this purpose, the epoxy resin component (A) and the curing agent composition (B) were poured into a 3:1 hard cartridge after mixing in a static quadro mixer (18 mixing levels, length of the mixing element: 11.5 cm, manufacturer Sulzer AG, Switzerland) and applied into the borehole.

In examples 11-15, 16, 17, 21-24 and 26 and in comparative examples 5 to 10, the epoxy resin component (A) and the curing agent composition (B) were mixed in a speed mixer in a ratio resulting in a balanced stoichiometry according to the EEW and AHEW values. The mixture was poured into a one-component cartridge as far as possible without bubbles, and was immediately injected into the borehole made for the pull-out tests.

The pull-out strength of the mortar compounds obtained by mixing the epoxy resin component (A) and curing agent composition (B) according to the below examples was determined using a high-strength threaded anchor rod M12 according to ETAG 001 Part 5, which was doweled into a hammer-drilled borehole having a diameter of 14 mm and a borehole depth of 69 mm with the relevant mortar compound in C20/25 concrete. The boreholes were cleaned; the number and type of the respective cleaning steps depended on the type of pull-out test.

For this purpose, the boreholes were filled up, by two thirds from the bottom of the borehole (A1, A22 and A21, 80° C.) or completely (F1c), with the mortar compound to be tested in each case. The threaded rod was pushed in by hand. The excess mortar was removed using a spatula.

The following types of pull-out tests were carried out.

| | |
|---|---|
| A1: | Dry concrete;<br>Hammer drilled;<br>Cleaning: blowing out with compressed air (6 bar) twice, brushing twice and then again blowing out with compressed air (6 bar) twice;<br>Embedding depth: 68 mm;<br>Curing for 24 hours at 25° C.; |
| A22: | Dry concrete;<br>Hammer drilled;<br>Cleaning: blowing out with compressed air (6 bar) twice, brushing twice and then again blowing out with compressed air (6 bar) twice;<br>Embedding depth: 68 mm;<br>Curing for 6 hours at 25° C.; |
| A21, 80° C.: | Dry concrete;<br>Hammer drilled;<br>Cleaning: blowing out with compressed air (6 bar) twice, brushing twice and then again blowing out with compressed air (6 bar) twice;<br>Embedding depth: 68 mm;<br>Curing for 6 hours at 25° C.; |
| F1c: | Water-saturated concrete;<br>Hammer drilled;<br>Cleaning: blowing out with compressed air (6 bar) once, brushing once and then again blowing out with compressed air (6 bar) once;<br>Injection: mixer extension with a piston plug into the water-filled borehole;<br>Embedding depth 68 mm<br>Curing for 48 hours at 25° C. |

The failure load was determined by centrally pulling out the threaded anchor rod with close support. The load values obtained with the mortar compounds using a curing agent composition (B) according to examples 1 to 26 and comparative examples 1 to 10 are shown in tables 10 and 11 below.

In order to be able to evaluate the mortar compounds under difficult conditions such as failure load at an elevated temperature and after application in the water-filled borehole, the quotient of failure load under difficult conditions (A21, F1c) and failure load in the reference borehole (dry, cleaned borehole, at room temperature) is generally formed. The result is the percentage of the reference load that remains under difficult conditions. The corresponding results are shown in the table below.

TABLE 10

Failure loads of the mortar compounds according to the invention according to examples 1 to 26

| | | | Pull-out tests load values [N/mm²] | | | | Ratio | |
|---|---|---|---|---|---|---|---|---|
| | (A) | (B) | A1 | A22 | A21 80° C. | F1c | A21:A1 | F1c:A1 |
| Example 1 | 1 | 1 | 31.7 | 17.5 | 18.6 | 27.5 | 0.59 | 0.87 |
| Example 2 | 2 | 2 | 32.3 | 28.2 | 26.6 | 19 | 0.82 | 0.59 |
| Example 3 | 3 | 3 | 34.3 | 27.9 | 26.9 | 20.5 | 0.78 | 0.60 |
| Example 4 | 4 | 4 | 31.1 | 22.7 | 26 | 20.7 | 0.84 | 0.67 |
| Example 5 | 5 | 5 | 31.3 | 26.2 | 24.5 | 21.2 | 0.78 | 0.68 |
| Example 6 | 6 | 6 | 32.1 | 24.6 | 25.7 | 25.8 | 0.80 | 0.80 |
| Example 7 | 7 | 7 | 33.1 | 23.3 | 22 | 23.8 | 0.66 | 0.72 |
| Example 8 | 8 | 8 | 34.1 | 27.6 | 24.3 | 22.7 | 0.71 | 0.67 |
| Example 9 | 9 | 9 | 31.5 | 19.8 | 26.6 | 25.5 | 0.84 | 0.81 |

TABLE 10-continued

Failure loads of the mortar compounds according to the invention according to examples 1 to 26

|  | (A) | (B) | Pull-out tests load values [N/mm²] | | | | Ratio | |
|---|---|---|---|---|---|---|---|---|
|  |  |  | A1 | A22 | A21 80° C. | F1c | A21:A1 | F1c:A1 |
| Example 10 | 10 | 10 | 34 | 23.3 | 27.6 | 26.6 | 0.81 | 0.78 |
| Example 11 | 11 | 11 | 34.9 | 21.9 | 28.6 | 19.3 | 0.82 | 0.55 |
| Example 12 | 11 | 12 | 37.2 | 28 | 28.8 | 20.6 | 0.77 | 0.55 |
| Example 13 | 11 | 13 | 37.8 | 31.6 | 27.9 | 19.5 | 0.74 | 0.52 |
| Example 14 | 11 | 14 | 36.8 | 34.5 | 28.8 | 19.6 | 0.78 | 0.53 |
| Example 15 | 11 | 15 | 37.6 | 35.9 | 26.6 | 18.9 | 0.71 | 0.50 |
| Example 16 | 12 | 16 | 33.2 | 30.2 | — | — | — | — |
| Example 17 | 12 | 17 | 34.3 | 29.5 | — | — | — | — |
| Example 18 | 13 | 18 | 33.7 | 25.4 | 29.2 | 19.2 | 0.87 | 0.57 |
| Example 19 | 14 | 19 | 30.4 | 22.2 | 24.6 | 23.6 | 0.81 | 0.78 |
| Example 20 | 15 | 20 | 31.2 | 14.6 | 23.7 | 26.5 | 0.76 | 0.85 |
| Example 21 | 11 | 21 | 34.3 | 21.2 | 25.2 | 30.2 | 0.73 | 0.88 |
| Example 22 | 11 | 22 | 30.3 | 21.9 | 29 | 29.8 | 0.96 | 0.98 |
| Example 23 | 11 | 23 | 31.9 | 21.2 | 24.8 | 29.1 | 0.78 | 0.91 |
| Example 24 | 11 | 24 | 34.3 | 26.5 | 21.6 | 27.5 | 0.63 | 0.80 |
| Example 25 | 16 | 25 | 32.4 | 21.8 | 28.3 | 19.5 | 0.87 | 0.60 |
| Example 26 | 17 | 26 | 35.5 |  | 31.3 | 25.9 | 0.88 | 0.73 |

TABLE 11

Failure loads of the mortar compounds according to comparative examples 1 to 10

|  | VA | VB | Put-out tests load values [N/mm²] | | | | Ratio | |
|---|---|---|---|---|---|---|---|---|
|  |  |  | A1 | A22 | A21 80° C. | F1c | A21:A1 | F1c:A1 |
| Comparative example 1 | 1 | 1 | 35.4 | 24.0 | 20.7 | 19.2 | 0.58 | 0.54 |
| Comparative example 2 | 2 | 2 | 29.4 | 22.5 | 17.6 | 16.3 | 0.60 | 0.55 |
| Comparative example 3 | 3 | 3 | 33.6 | 28.8 | 19 | 17.6 | 0.57 | 0.52 |
| Comparative example 4 | 4 | 4 | 29.6 | 10.9 | 20.2 | 19.8 | 0.68 | 0.67 |
| Comparative example 5 | 5 | 5 | 33.2 | 37.4 | 26.9 | 18.5 | 0.70 | 0.43 |
| Comparative example 6 | 6 | 6 | 38.8 | — | 23.9 | 20.6 | 0.62 | 0.53 |
| Comparative example 7 | 7 | 7 | 25.4 | — | — | — | — | — |
| Comparative example 8 | 7 | 8 | 15.4 | — | — | — | — | — |
| Comparative example 9 | 7 | 9 | 19.1 | — | — | — | — | — |
| Comparative example 10 | 7 | 10 | 24.5 | — | — | — | — | — |

The invention claimed is:

1. A curing agent composition, comprising:
3-aminomethyl-3,5,5-trimethylcyclohexan-1-amine and at least one further cycloaliphatic amine which is reactive to epoxy groups and at least one salt (S), wherein the at least one salt (S) is selected from the group consisting of salts of nitric acid, salts of nitrous acid, salts of halogens, salts of trifluoromethanesulfonic acid and combinations thereof, and wherein the 3-aminomethyl-3,5,5-trimethylcyclohexan-1-amine is contained in the curing agent composition in a proportion of at least 10 wt. % based on the total weight of all amines reactive to epoxy groups.

2. The curing agent composition according to claim 1, wherein the at least one further cycloaliphatic amine which is reactive to epoxy groups comprises at least one cyclohexyl group.

3. The curing agent composition according to claim 1, wherein the at least one further cycloaliphatic amine which is reactive to epoxy groups is selected from the group consisting of 4-methyl-cyclohexane-1,3-diamine, bicyclo[2.2.1]heptanebis(methyl-amine), 1,2-diaminocyclohexane, 1,3-cyclo-hexane-bis(methyl-amine), 4,4'-methylenebis(cyclohexylamine) and combinations thereof.

4. The curing agent composition according to claim 1, wherein the 3-aminomethyl-3,5,5-trimethylcyclohexan-1-amine is contained in the curing agent composition in a proportion of at least 25 wt. % based on total weight of all amines reactive to epoxy groups.

5. The curing agent composition according to claim 1, wherein the at least one salt (S) is selected from the group consisting of nitrate ($NO_3^-$), iodide ($I^-$), triflate ($CF_3SO_3^-$) and mixtures thereof.

6. The curing agent composition according to claim 1, wherein the at least one salt (S) comprises a cation selected from the group consisting of alkali metals, alkaline earth metals, lanthanides, aluminum, ammonium and combinations thereof.

7. The curing agent composition according to claim 1, wherein the at least one salt (S) is contained in a proportion of from 0.1 to 15 wt. % based on total weight of the curing agent composition.

8. The curing agent composition according to claim 1, wherein the curing agent composition comprises 3-aminomethyl-3,5,5-trimethylcyclohexan-1-amine and 1,3-cyclohexane-bis(methyl-amine).

9. The curing agent composition according to claim 1, wherein the curing agent composition comprises 3-aminomethyl-3,5,5-trimethylcyclohexan-1-amine and 4,4'-methylenebis(cyclohexylamine).

10. An epoxy resin compound, comprising:
at least one curable epoxy resin; and
a curing agent composition according to claim 1.

11. The epoxy resin compound according to claim 10, wherein the epoxy resin compound is a multi-component epoxy resin compound.

12. A method for the chemical fastening of construction elements in boreholes, the method comprising:
   chemical fastening of the construction elements with an epoxy resin compound according to claim 10.

13. A cured compound formed by curing the epoxy resin compound according to claim 10.

14. A multi-component epoxy resin system, comprising:
   an epoxy resin component (A) and a curing agent component,
   wherein the epoxy resin component (A) contains a curable epoxy resin, and
   the curing agent component contains 3-aminomethyl-3,5,5-trimethylcyclohexan-1-amine and at least one further cycloaliphatic amine which is reactive to epoxy groups,
   wherein 3-aminomethyl-3,5,5-trimethylcyclohexan-1-amine is contained in the curing agent component in a proportion of at least 10 wt. % based on total weight of all amines reactive to epoxy groups, and
   further comprising a salt (S) selected from the group consisting of salts of nitric acid, salts of nitrous acid, salts of halogens, salts of trifluoromethanesulfonic acid and combinations thereof contained in the epoxy resin component (A) and/or in the curing agent component.

15. The multi-component epoxy resin system according to claim 14, wherein the salt (S) is contained in the curing agent component.

16. A method for the chemical fastening of construction elements in boreholes, the method, comprising:
   chemical fastening with a multi-component epoxy resin system according to claim 14.

17. A method, comprising:
   employing as an accelerator at least one salt (S) selected from the group consisting of salts of nitric acid, salts of nitrous acid, salts of halogens, salts of trifluoromethanesulfonic acid and combinations thereof,
   in an epoxy resin compound comprising 3-aminomethyl-3,5,5-trimethylcyclohexan-1-amine and at least one further cycloaliphatic amine which is reactive to epoxy groups.

* * * * *

UNITED STATES PATENT AND TRADEMARK OFFICE
CERTIFICATE OF CORRECTION

PATENT NO.        : 11,236,194 B2
APPLICATION NO.   : 17/276852
DATED             : February 1, 2022
INVENTOR(S)       : Nicole Behrens et al.

It is certified that error appears in the above-identified patent and that said Letters Patent is hereby corrected as shown below:

On the Title Page

Item (57), the Abstract currently reads:
"The invention relates to a curing agent composition for an epoxy resin compound for the chemical fastening of construction elements, to an epoxy resin compound, and to a multi-component epoxy resin system. The invention further relates to a method for the chemical fastening of construction elements in boreholes. The invention also relates to the use of a salt (S) as an accelerator in an epoxy resin compound for chemical fastening, the epoxy resin compound comprising 3-aminomethyl-3,5,5-trimethylcyclohexane and at least one further cycloaliphatic amine which is reactive to epoxy groups."

And should read:
-- A curing agent composition for an epoxy resin compound for the chemical fastening of construction elements, an epoxy resin compound, and a multi-component epoxy resin system are described. Methods for the chemical fastening of construction elements in boreholes and methods of using a salt (S) as an accelerator in an epoxy resin compound for chemical fastening have the epoxy resin compound including 3-aminomethyl-3,5,5-trimethylcyclohexane and at least one further cycloaliphatic amine which is reactive to epoxy groups. --.

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*